US012781564B2

(12) United States Patent
Lehner, Jr. et al.

(10) Patent No.: US 12,781,564 B2
(45) Date of Patent: Nov. 3, 2026

(54) STORM SHUTTER SYSTEMS

(71) Applicant: Schlage Lock Company LLC, Carmel, IN (US)

(72) Inventors: Jack R. Lehner, Jr., Indianapolis, IN (US); Shannon Ballard, Pleasant Plain, OH (US); David J. Wells, Cleves, OH (US)

(73) Assignee: Schlage Lock Company LLC, Carmel, IN (US)

( * ) Notice: Subject to any disclaimer, the term of this patent is extended or adjusted under 35 U.S.C. 154(b) by 107 days.

(21) Appl. No.: 17/376,282

(22) Filed: Jul. 15, 2021

(65) Prior Publication Data

US 2023/0013872 A1 Jan. 19, 2023

(51) Int. Cl.

*E06B 9/04* (2006.01)
*E05D 15/48* (2006.01)
*E05F 15/652* (2015.01)
*E06B 9/00* (2006.01)

(52) U.S. Cl.

CPC ................ *E06B 9/04* (2013.01); *E05D 15/48* (2013.01); *E05F 15/652* (2015.01); *E05D 2015/485* (2013.01); *E05Y 2201/22* (2013.01); *E06B 2009/005* (2013.01)

(58) Field of Classification Search

CPC .............................. E05F 15/652; E05F 15/71; E06B 2003/7046; E06B 3/46; E06B 9/04; Y10T 292/1043; Y10T 292/1076; Y10T 292/1078; Y10T 292/0911; Y10T 292/0945; Y10T 292/0948
USPC .................................. 49/370, 449, 120, 118
See application file for complete search history.

(56) References Cited

U.S. PATENT DOCUMENTS

| | | | | |
|---|---|---|---|---|
| 575,644 A * | 1/1897 | Heath | E06B 9/04 | 16/97 |
| 623,552 A * | 4/1899 | Loomis | E05C 19/022 | 292/99 |
| 742,092 A * | 10/1903 | Cossey | E05C 19/022 | 292/99 |
| 931,247 A * | 8/1909 | Armstrong | E06B 9/04 | 16/86 A |

(Continued)

FOREIGN PATENT DOCUMENTS

| | | |
|---|---|---|
| AU | 2015274222 A1 | 12/2016 |
| WO | 2013139873 A1 | 9/2013 |

(Continued)

OTHER PUBLICATIONS https://www.alutech.com/products/alu-star-roll-shutters/hurricane-shutters/barracuda.htm; Jun. 9, 2021; 3 pages.

*Primary Examiner* — Abe Massad
*Assistant Examiner* — Matthew R. Shepherd
(74) *Attorney, Agent, or Firm* — Taft Stettinius & Hollister LLP

(57) ABSTRACT

An exemplary method involves operating a storm shutter system installed to a building adjacent an opening. The storm shutter system includes a panel, a motor operable to drive the panel between a first position and a second position, and a control assembly operable to control the motor. The method includes receiving, by the control assembly, information from an external device. The method further includes operating the motor to linearly drive the panel from the first position to the second position in response to receiving the information.

9 Claims, 6 Drawing Sheets

(56) References Cited

U.S. PATENT DOCUMENTS

| | | | | | |
|---|---|---|---|---|---|
| 1,057,349 | A * | 3/1913 | Kurzwelly | E05B 65/0007 | 292/341.17 |
| 1,073,057 | A * | 9/1913 | Schmid | E05C 19/022 | 292/99 |
| 4,698,938 | A * | 10/1987 | Huber | E05F 15/652 | 49/362 |
| 6,098,341 | A * | 8/2000 | Gebauer | E05F 15/652 | 49/362 |
| 6,385,910 | B1 * | 5/2002 | Smink | E05D 15/08 | 49/213 |
| 6,427,749 | B1 | 8/2002 | Swink et al. | | |
| 6,631,749 | B1 | 10/2003 | Zabala | | |
| 7,296,608 | B2 | 11/2007 | Weishar et al. | | |
| 8,756,864 | B2 | 6/2014 | Hamaker et al. | | |
| 8,826,598 | B2 | 9/2014 | Ranaudo et al. | | |
| 9,222,297 | B2 | 12/2015 | Uehara et al. | | |
| 9,458,656 | B2 | 10/2016 | Mickelson | | |
| 9,663,980 | B2 | 5/2017 | Bakalar | | |
| 10,001,228 | B2 * | 6/2018 | Gundstrup | C22C 38/14 | |
| 10,280,678 | B1 | 5/2019 | Rendon, Jr. et al. | | |
| 10,724,278 | B2 | 7/2020 | Provencher et al. | | |
| 11,053,727 | B2 * | 7/2021 | Houk | E05F 17/004 | |
| 2002/0157317 | A1 * | 10/2002 | Valencia | E05F 15/643 | 49/366 |
| 2006/0005485 | A1 * | 1/2006 | Epps | G10L 15/26 | 704/E15.045 |
| 2007/0210737 | A1 * | 9/2007 | Brander | E05F 15/71 | 318/483 |
| 2008/0271855 | A1 * | 11/2008 | Hirsh | E06B 7/08 | 160/181 |
| 2010/0050530 | A1 | 3/2010 | Blasi | | |
| 2012/0073208 | A1 * | 3/2012 | Lee | E05F 15/652 | 49/449 |
| 2017/0081917 | A1 * | 3/2017 | Brunk | E06B 9/72 | |
| 2019/0003236 | A1 * | 1/2019 | Hall | E06B 3/4609 | |
| 2019/0071926 | A1 * | 3/2019 | Hall | E06B 9/364 | |
| 2019/0112860 | A1 * | 4/2019 | Urban | E05F 15/73 | |
| 2019/0113312 | A1 * | 4/2019 | Adrain | F41H 5/26 | |
| 2019/0352953 | A1 | 11/2019 | Warnbring et al. | | |
| 2020/0199924 | A1 | 6/2020 | Vander Bent, Jr. et al. | | |

FOREIGN PATENT DOCUMENTS

| | | | |
|---|---|---|---|
| WO | 2015188210 | A1 | 12/2015 |
| WO | 2017176831 | A1 | 10/2017 |

* cited by examiner

STORM SHUTTER SYSTEMS

TECHNICAL FIELD

The present disclosure generally relates to storm shutters, and more particularly but not exclusively relates to motorized and/or automated storm shutter systems.

BACKGROUND

Storm shutters are often used to protect openings (such as windows and doors) from debris during adverse weather events, such as hurricanes and tornadoes. Storm shutters are constructed in various configurations. In conventional storm shutter systems, human intervention is required to protect the openings. For example, typical conventional systems require that the user physically move the storm shutters to the closed position when an adverse weather event is predicted. Some conventional systems also require the user to physically fasten the panels to the frame. In situations in which the building is not a permanent residence, the owner or a caretaker will typically need to travel to the building, which can be time-consuming and even dangerous, for example if the adverse weather event is approaching. For these reasons among others, there remains a need for further improvements in this technological field.

SUMMARY

An exemplary method involves operating a storm shutter system installed to a building adjacent an opening. The storm shutter system includes a panel, a motor operable to drive the panel between a first position and a second position, and a control assembly operable to control the motor. The method includes receiving, by the control assembly, information from an external device. The method further includes operating the motor to linearly drive the panel from the first position to the second position in response to receiving the information. Further embodiments, forms, features, and aspects of the present application shall become apparent from the description and figures provided herewith.

DETAILED DESCRIPTION OF ILLUSTRATIVE EMBODIMENTS

Figure 2:
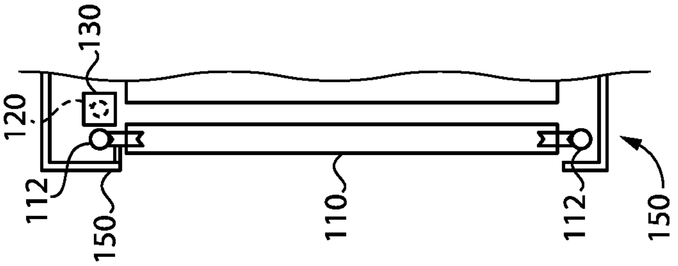
FIG. 2 is a side view of the storm shutter system illustrated in FIG. 1.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
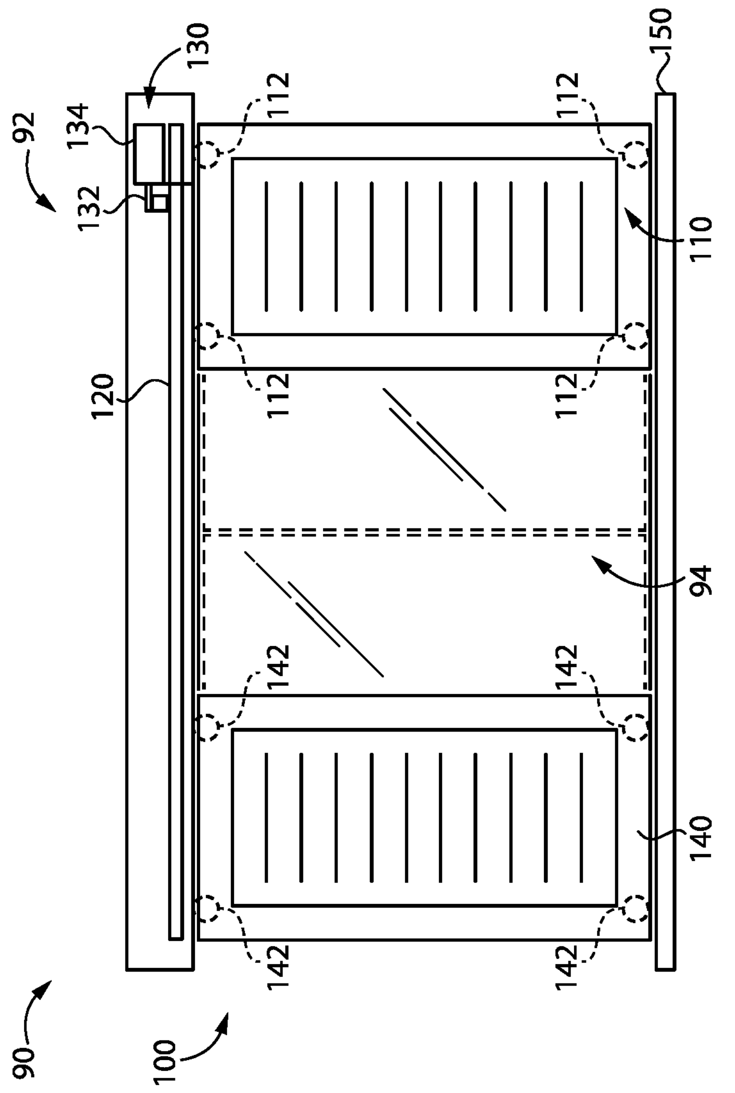
FIG. 1 is a front view of a storm shutter system according to certain embodiments.

With reference to FIGS. 1 and 2, illustrated therein is a motorized storm shutter system 100 according to certain embodiments installed to a building 90. The building 90 includes a wall 92 having an opening 94 formed therein, and the storm shutter system 100 is installed about the opening 94. While the illustrated opening 94 is provided as a window, it is also contemplated that the storm shutter system 100 may be utilized to protect other forms of openings, such as doors. As described herein, the storm shutter system 100 has an open state in which the opening 94 is exposed, and a closed state in which the opening 94 is covered by the system 100.

The storm shutter system 100 generally includes a first shutter panel 110, a longitudinally-extending transmission 120 engaged with the first panel 110, and a motor 130 engaged with the transmission 120 such that the motor 130 is operable to longitudinally drive the first panel 110 between an open position and a closed position. In the illustrated form, the storm shutter system 100 further includes a second panel 140 engaged with the transmission 120, and at least one longitudinally-extending support rail 150 that slidably supports each of the first panel 110 and the second panel 140. In certain embodiments, the storm shutter system 100 may be battery powered and/or line-powered. Additionally or alternatively, the storm shutter system 100 may include one or more solar cells operable to charge a battery by which the storm shutter system 100 may be powered.

Figure 3:
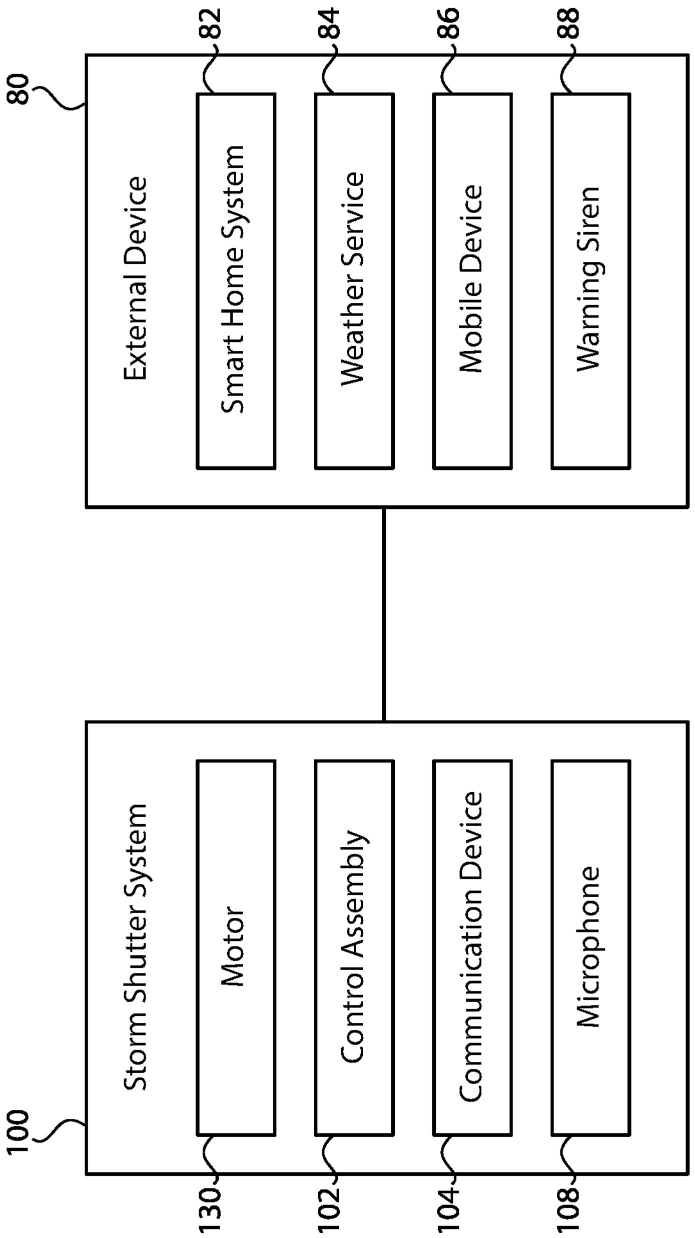
FIG. 3 is a schematic block diagram of the storm shutter system illustrated in FIG. 1.

With additional reference to FIG. 3, the storm shutter system 100 further includes a control assembly 102 operable to control the motor 130, and may further include a communication device 104 that facilitates communication between the control assembly 102 and an external device 80. In certain embodiments, the communication device 80 may be a wireless communication device. In certain embodiments, the communication device 80 may be a wired communication device. As described herein, in certain embodiments, the control assembly 102 may control the motor 130 to open and/or close the shutter panels 110, 140 based on information received from the external device 80, such as a smart home system 82, a weather service 84, and/or a mobile device 86.

The first shutter panel 110 is engaged with the transmission 120 such that the motor 130 is operable to drive the first panel 110 between an open position (to the right in FIG. 1) and a closed position (to the left in FIG. 1). The first shutter panel 110 may, for example, be formed of an impact-resistant material such that the panel 110 protects the opening 94 when in the closed position. The panel 110 may include one or more rollers 112 for engaging each support rail 150 such that each support rail 150 supports the panel 110 for longitudinal movement between its open position and its closed position. In certain embodiments, the panel 110 may be solid and/or opaque. In certain embodiments, the panel 110 may be louvered. In certain embodiments, the panel 110 may include a see-through portion that may, for example, be formed of polycarbonate or impact-resistant glass. The panel 110 is preferably rigid, and in the illustrated form is inoperable to roll onto itself or fold.

The transmission 120 extends in longitudinal directions, including a proximal direction (to the left in FIG. 1) and a distal direction (to the right in FIG. 1). The transmission 120 is configured to convert rotation of the motor 130 to longitudinal movement of the shutter panels 110, 140. More particularly, the transmission 120 is configured to move the panels 110, 140 toward closed positions in response to the motor 130 generating a first rotation, and is configured to move the panels 110, 140 toward open positions in response to the motor 130 generating a second rotation opposite the first rotation. Certain example forms of the transmission 120 are provided herein with reference to FIGS. 4 and 5.

The motor 130 is operably connected with the transmission 120, and generally includes a motor shaft 132 and a body portion 134 operable to rotate the shaft 132 in each of a first or closing direction and a second or opening direction. As described herein, the transmission 120 is configured to convert the first or closing rotation to closing movement of the panels 110, 140, and to convert second or opening movement to opening movement of the panels 110, 140. The motor 130 is in communication with the control assembly 102 and/or an external device 80, and is configured to rotate the shaft 132 based upon information received from the control assembly 102 and/or the external device 80.

The second shutter panel 140 is substantially similar to the first shutter panel 110, and is engaged with the transmission 120 such that the motor 130 is operable to drive the second panel 140 between an open position (to the left in FIG. 1) and a closed position (to the right in FIG. 1). The second shutter panel 140 may, for example, be formed of an impact-resistant material such that the panel 140 protects the opening 94 when in the closed position. The panel 140 may include one or more rollers 142 for engaging each support rail 150 such that each support rail 150 supports the panel 140 for longitudinal movement between its open position and its closed position. In certain embodiments, the panel 140 may be solid and/or opaque. In certain embodiments, the panel 140 may be louvered. In certain embodiments, the panel 140 may include a see-through portion that may, for example, be formed of polycarbonate or impact-resistant glass. The panel 140 is preferably rigid, and in the illustrated form is inoperable to roll into a rolled state.

The support rail 150 supports the panels 110, 140 for movement between the open and closed positions thereof. In the illustrated form, two support rails 150 are secured to the wall 92 on opposite sides of the opening 94. While the illustrated support rails 150 support the panels 110, 140 via rollers 112, 114, it is also contemplated that other arrangements may be utilized, such as glide mounts.

Figure 4:
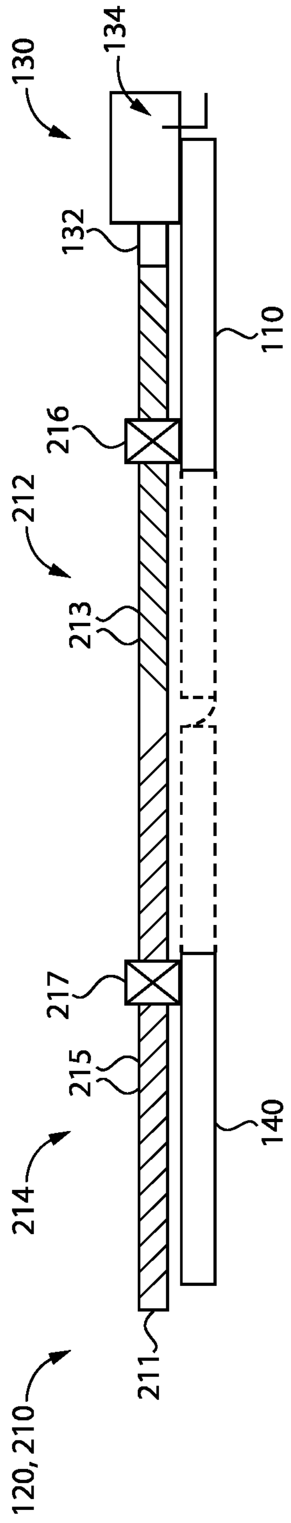
FIG. 4 is a top-down view of a transmission according to certain embodiments.

With additional reference to FIG. 4, illustrated therein is a screw-drive transmission 210 according to certain embodiments installed to the storm shutter system 100 as the transmission 120. The screw-drive transmission 210 includes a longitudinally-extending screw shaft 211 that is engaged with the motor shaft 132 such that the motor 130 is operable to rotate the screw shaft 211 in first and second directions. In the illustrated form, the screw shaft 211 is directly coupled to the motor shaft 132, and may be integrally formed with the motor shaft 132. It is also contemplated that the screw shaft 211 may be indirectly engaged with the motor shaft 132, for example via one or more gears and/or one or more belts.

The screw shaft 211 includes a first threaded region 212 including first threads 213 and a second threaded region 214 including second threads 215. The first threads 213 are formed in a first direction (e.g., one of a right-handed threading direction or a left-handed threading direction), and the second threads 215 are formed in an opposite second direction (e.g., the other of the right-handed threading direction or the left-handed threading direction). Mounted on the first threaded region 212 is a first transmission block 216 that includes an internal threading engaged with the first threads 213. Mounted on the second threaded region 214 is a second transmission block 217 that includes an internal threading engaged with the second threads 215. The first transmission block 216 is coupled with the first panel 110, and the second transmission block 217 is coupled with the second panel 140.

When the screw shaft 211 is rotated in a first or closing direction, each set of threads 213, 215 urges the corresponding transmission block 216, 217 in a corresponding closing direction, thereby driving the panels 110, 140 toward the closed positions thereof. For example, the first threads 213 urge the first transmission block 216 proximally, thereby inwardly driving the first panel 110 toward its proximal closed position (leftward in FIG. 4). Conversely, the second threads 215 urge the second transmission block 217 distally, thereby inwardly driving the second panel 140 toward its distal closed position (rightward in FIG. 4). As will be appreciated, the opposite directions of the inward closing movements for the first panel 110 and the second panel 140 are a result of the opposite threading orientations of the first threads 213 relative to the second threads 215.

When the screw shaft 211 is rotated in a second or opening direction, each set of threads 213, 215 urges the corresponding transmission block 216, 217 in a corresponding opening direction, thereby driving the panels 110, 140 toward the open positions thereof. For example, the first threads 213 urge the first transmission block 216 distally, thereby outwardly driving the first panel 110 toward its distal open position (rightward in FIG. 4). Conversely, the second threads 215 urge the second transmission block 217 proximally, thereby outwardly driving the second panel 140 toward its proximal open position (leftward in FIG. 4). As will be appreciated, the opposite directions of the outward opening movements for the first panel 110 and the second panel 140 are a result of the opposite threading orientations of the first threads 213 relative to the second threads 215.

Figure 5:
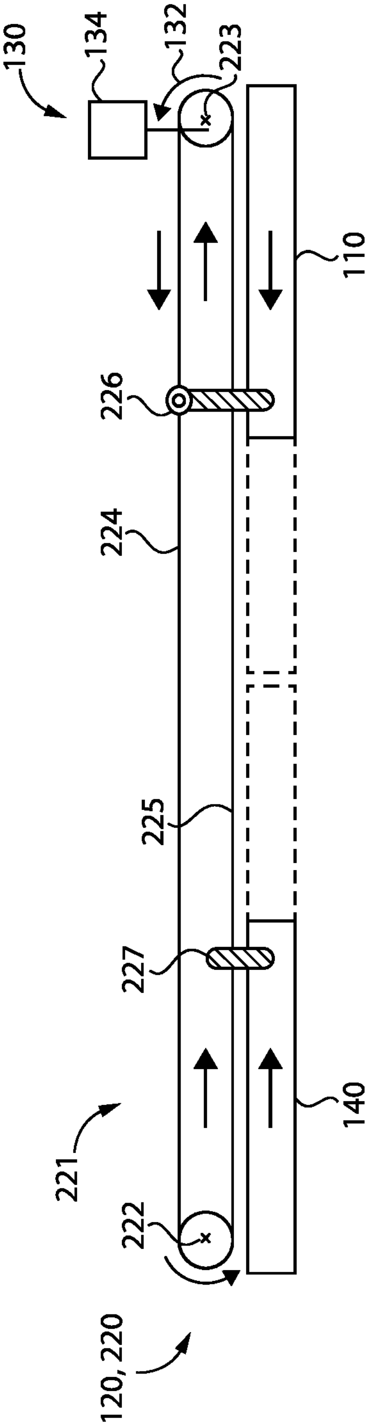
FIG. 5 is a top-down view of a transmission according to certain embodiments.

With additional reference to FIG. 5, illustrated therein is a pulley-drive transmission 220 according to certain embodiments installed to the storm shutter system 100 as the transmission 120. The pulley-drive transmission 220 includes a longitudinally-extending flexible tether 221, such as a chain, belt, rope, or cable. The tether 221 is wrapped about an idle pulley 222 and an active pulley 223, the latter of which is engaged with the motor shaft 132 such that the motor 130 is operable to rotate the active pulley 223 in first and second directions. In the illustrated form, the active pulley 223 is directly coupled to the motor shaft 132, and may be integrally formed with the motor shaft 132. It is also contemplated that the active pulley 223 may be indirectly engaged with the motor shaft 132, for example via one or more gears and/or one or more belts. In certain forms, such as those in which the tether 221 is provided in the form of a chain, one or both of the pulleys 222, 223 may include gear teeth to engage the chain links.

The tether 221 includes a first section 224 and a second section 225. In the illustrated form, the first section 224 is a rear section, and the second section 225 is a front section. It is also contemplated that these orientations may be reversed. A first transmission block 226 is coupled with each of the first section 224 and the first panel 110. Similarly, a second transmission block 227 is coupled with each of the second section 225 and the second panel 140.

When the active pulley 223 is rotated in a first or closing direction (counter-clockwise in FIG. 5), each section 224, 225 of the tether 221 urges the corresponding transmission block 216, 217 in a corresponding closing direction, thereby driving the panels 110, 140 toward the closed positions thereof. For example, the first section 224 moves the first transmission block 226 proximally, thereby inwardly driving the first panel 110 toward its proximal closed position (leftward in FIG. 5). Conversely, the second section 255 moves the second transmission block 227 distally, thereby inwardly driving the second panel 140 toward its distal closed position (rightward in FIG. 5). As will be appreciated, the opposite directions of the inward closing movements for the first panel 110 and the second panel 140 are a result of the transmission blocks 216, 217 being coupled to sections 224, 225 that move in opposite directions in response to rotation of the active pulley 223 in the closing direction.

When the active pulley 223 is rotated in a second or opening direction (clockwise in FIG. 5), each section 224, 225 of the tether 221 urges the corresponding transmission block 216, 217 in a corresponding opening direction, thereby driving the panels 110, 140 toward the open positions thereof. For example, the first section 224 moves the first transmission block 226 distally, thereby outwardly driving the first panel 110 toward its distal open position (rightward in FIG. 5). Conversely, the second section 225 moves the second transmission block 227 proximally, thereby outwardly driving the second panel 140 toward its proximal open position (leftward in FIG. 5). As will be appreciated, the opposite directions of the outward opening movements for the first panel 110 and the second panel 140 are a result of the transmission blocks 216, 217 being coupled to sections 224, 225 that move in opposite directions in response to rotation of the active pulley 223 in the opening direction.

In order to operate the system 100, a user and/or a control system may cause the control assembly 102 to control the motor 130 to thereby open and/or close the panels 110, 140. For example, the user and/or the control system may transmit a close command to close the panels 110, 140, and the control assembly 102 may cause the motor 130 to rotate the shaft 132 in the closing direction in response to such a close command. Similarly, the user and/or the control system may transmit an open command to open the panels 110, 140, and the control assembly 102 may cause the motor 130 to rotate the shaft 132 in the opening direction in response to such an open command.

In certain embodiments, the open/close command may be provided by a local user. For example, the control assembly 102 may include a control panel including a user interface that allows the user to transmit the open/close command at the site of the system 100. Additionally or alternatively, the open/close command may be provided remotely, such as via the external device 80. As one example, the system 100 may be provided as an Internet of Things (IoT) device that is integrated with a smart home system 82. In such forms, the smart home system 82 may transmit open and closed commands according to a preset schedule and/or in response to one or more criteria. For example, the smart home system 82 may cause the storm shutter system 100 to close the panels 110, 140 in response to a user-set schedule, a user command, and/or information indicating that an adverse weather condition is predicted. Such adverse weather predictions may, for example, be provided by an external weather service 84.

In certain forms, the control assembly 102 may be in communication with the external weather service 84, and be configured to close the panels 110, 140 in response to information indicating that an adverse weather condition is predicted. Additionally or alternatively, the system 100 may include a microphone 108, and the control assembly 102 be configured to initiate the closing operation in response to detection of a severe weather warning siren 88. When the adverse weather has passed, the control assembly 102 may initiate the open operation to return the panels 110, 140 to the open positions thereof.

In certain embodiments, the user may transmit the open/close command via a mobile device 86. Such commands issued via the mobile device 86 may, for example, be relayed to the control assembly 102 via the smart home system 84. In certain embodiments, the control assembly 102 may provide information to the external device 80 regarding the open/closed state of the panels 110, 140 such that a user can determine remotely whether the panels 110, 140 are open or closed.

Figure 6:
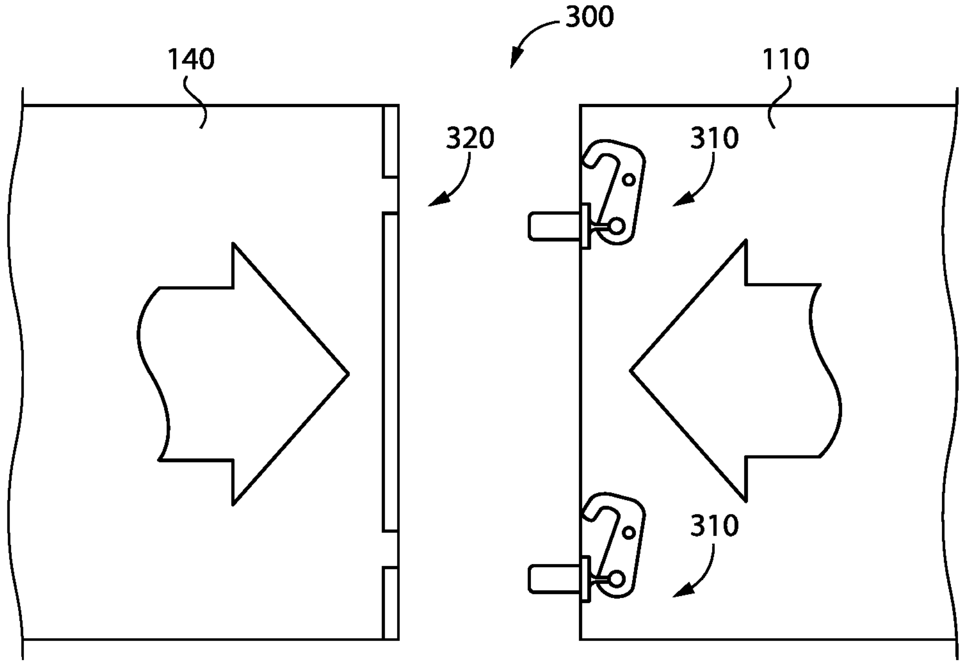
FIG. 6 illustrates a latch assembly according to certain embodiments during closure of the storm shutter system illustrated in FIG. 1.
Figure 7:
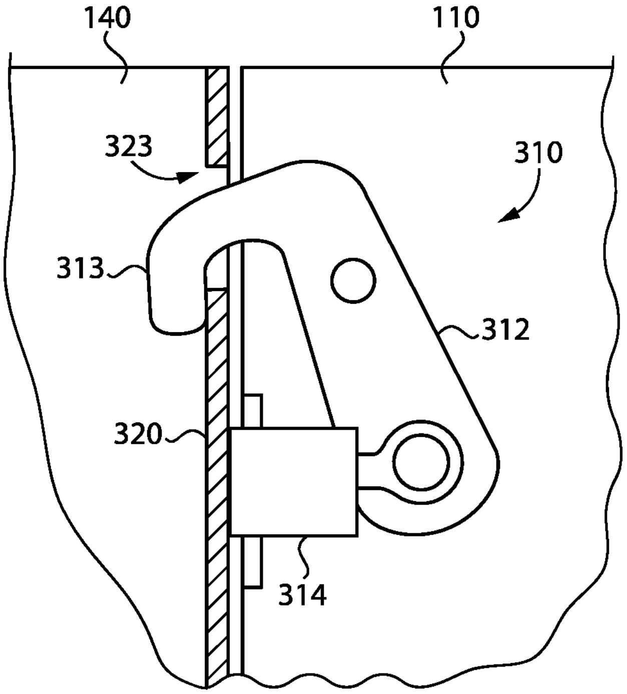
FIG. 7 illustrates a portion of the latch assembly illustrated in FIG. 6 while in a latching state.

With additional reference to FIGS. 6 and 7, illustrated therein is a latch assembly 300 that may be utilized in certain embodiments of the storm shutter system 100. In the illustrated form, the latch assembly 300 generally includes at least one latch mechanism 310 mounted to the first panel 110 and a flange 320 formed on the second panel 140. As described herein, the latch assembly 300 is configured to latch the panels 110, 140 in the closed positions thereof in response to the panels 110, 140 reaching the closed positions thereof.

Each latch mechanism 310 includes a latch 312 that is pivotably mounted to the first panel 110, and which includes a hook 313 operable to engage a corresponding feature of the flange 320. Each latch mechanism 310 also includes a trigger 314 that is engaged with the latch 314 and which is operable to pivot the latch 312 between an unlatching position (FIG. 6) and a latching position (FIG. 7). The flange 320 extends transversely from the inward side of the second panel 140, and includes at least one opening 323 operable to receive the hook 313 when the latch 312 is in its latching position. As the panels 110, 140 are driven to the closed positions thereof, the trigger 314 engages the flange 320. This action pivots the hook 313 into the opening 323, thereby locking the panels 110, 140 in the closed positions thereof.

Figure 8:
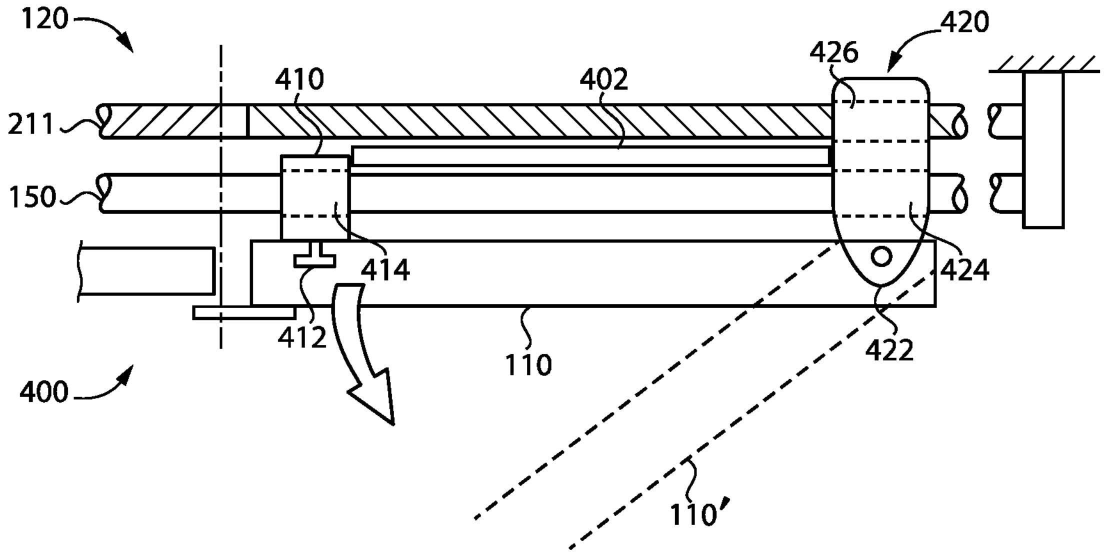
FIG. 8 is a top-down view of the storm shutter system illustrated in FIG. 1.
Figure 9:
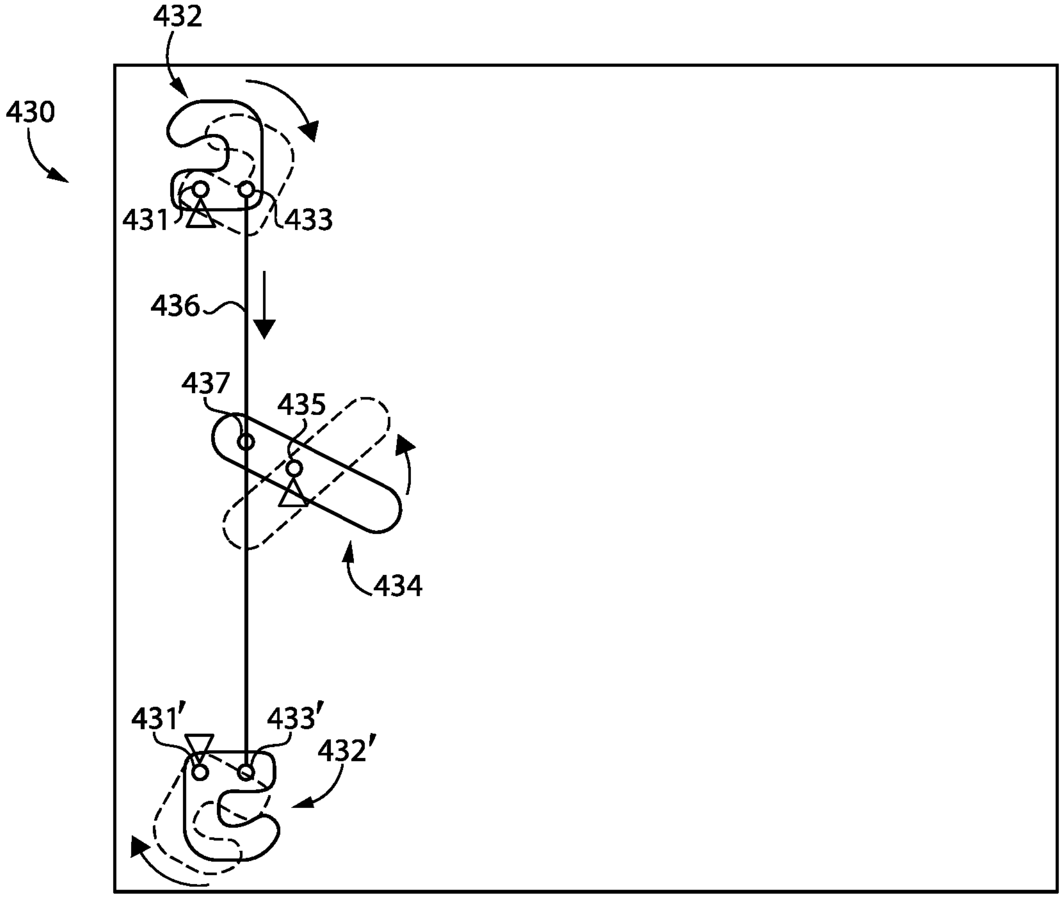
FIG. 9 is a rear side view of a panel of the storm shutter system illustrated in FIG. 1.

With additional reference to FIGS. 8 and 9, illustrated therein is an emergency exit assembly 400 that may be utilized in certain embodiments of the storm shutter system 100. While the illustrated embodiment of the storm shutter system 100 is illustrated as including the screw-drive transmission 210 illustrated in FIG. 4, it is also contemplated that the emergency exit assembly 400 may be utilized in combination with the pulley-drive transmission illustrated in FIG. 5. Moreover, although the emergency exit assembly 400 is specifically described herein with reference to the first panel 110, it should be appreciated that similar features may be provided to the second panel 140. As described herein, the emergency exit assembly 400 generally includes a first pair of trucks 410, a second pair of trucks 420, and a latch assembly 430 operable to engage the first pair of trucks 410 to selectively maintain the panel 110 in a secured position.

In the illustrated form, the panel 110 is supported by two pairs of trucks 410, 420, each of which is movably supported by the support rail 150. Each first truck 410 includes a latch pin 412 by which the first truck 410 is selectively coupled with the panel 110 as described herein. The first truck 410 also includes a first support region 414 by which the first truck 410 is supported by the support rail 150. In the illustrated form, the support region 414 is provided in the form of a through-hole, and the support rail 150 extends through the through-hole. It is also contemplated that the support region 414 may engage the support rail 150 in another manner, such as via rollers. As described herein, the first truck selectively supports the longitudinally-inward side of the panel 110 during movement of the panel 110 between its open and closed positions.

Each second truck 420 is positioned longitudinally outward of the first truck 410, and includes a pivot joint 422 by which the second truck 420 is pivotably coupled with the panel 110. The second truck 420 also includes a support region 424 engaged with the support rail 150, and a transmission engagement region 426 engaged with the screw shaft 211. The support region 424 corresponds to the support region 414 of the first truck 410, and may, for example, take one of the forms described above with reference to the support region 414. The transmission engagement region 426 includes an internal threading that engages with the threading of the screw shaft 211 such that the second truck 426 is operable to drive the panel 110 between its open and closed positions in a manner analogous to that described above with reference to the transmission block 216.

The latch assembly 430 is mounted to the panel 110, and generally includes a pair of latches 432, 432' operable to engage the latch pins 412 of the first trucks 410, a handle 434, and a connector 436 connecting the handle 434 with the latches 432, 432'. In the illustrated form, each latch 432, 432' is pivotably mounted to the panel 110 at a corresponding pivot point 431, 431' for movement between a latching position and an unlatching position. It is also contemplated that one or both of the latches 432, 432' may be mounted for another type of movement, such as sliding movement. Each latch 432, 432' is also connected to the connector 436 at a corresponding connection point 433, 431' that is offset from the corresponding pivot point 431, 431'

The illustrated handle 434 is pivotably mounted to the panel at a pivot point 435, and is pivotable between a first position corresponding to the latching positions of the latches 432, 432' and a second position corresponding to the unlatching positions of the latches 432, 432'. It is also contemplated that the handle 434 may be mounted for another type of movement between the first and second positions, such as sliding movement. The connector 436 is connected to the handle 434 at a handle connection point 437, and is connected to each of the latches 432, 432' at a corresponding latch connection point 433, 433'

With the emergency exit assembly 400 in a secured state, the latches 432, 432' are engaged with the latch pins 412, and thereby retain the panel 110 in its pivotably closed position. In this state, the panel 110 is slidable between its open and closed positions, for example by operating the motor 130 in a manner analogous to that described above. From the secured state, the assembly 400 may be transitioned to an unsecured state by moving the handle 434 from its first position to its second position, thereby pivoting the latches 432, 432' to the unlatching positions.

In the unsecured state, the latches 432, 432' are in the unlatching positions. In the unlatching positions, the latches 432, 432' are disengaged from the latch pins 412, thereby permitting the panel 110 to swing between a swinging closed position and a swinging open position 110'. In certain embodiments, the first truck 410 and the second truck 420 may be connected via a linkage 402 to maintain proper positioning of the trucks 410, 420 when the panel 110 is in the swinging open position 110'.

In the illustrated form, the emergency exit assembly 400 is installed to the interior (i.e., building-facing) side of the panel 110. This arrangement enables a person from within the building 90 to operate the assembly 400 for egress via the opening 94. This arrangement also prevents users outside the building 80 from accessing to the handle 434, thereby enhancing security and preventing external access when the panel 110 is in its fully closed position.

Figure 10:
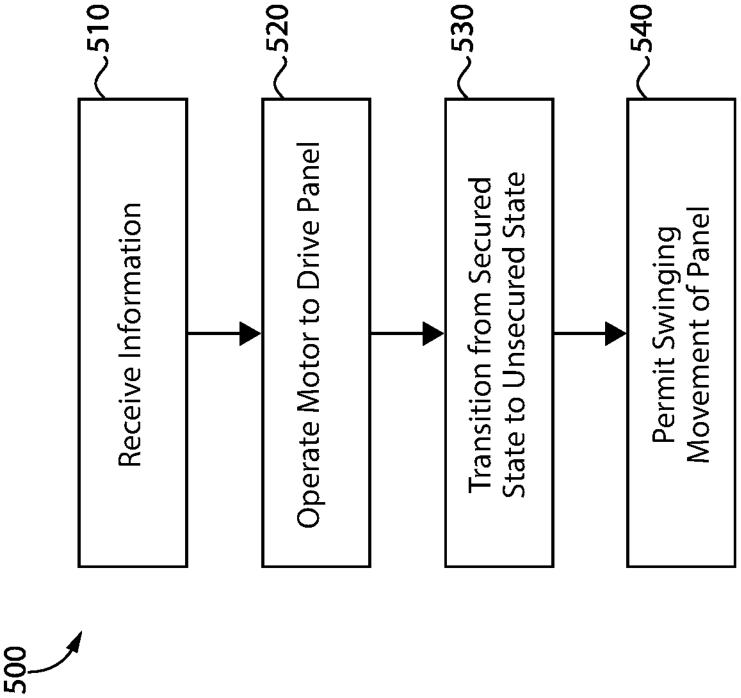
FIG. 10 is a schematic flow diagram of a process according to certain embodiments.

With additional reference to FIG. 10, an exemplary process 500 that may be performed using the storm shutter system 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the storm shutter system 100 illustrated in FIGS. 1-9, it is to be appreciated that the process 500 may be performed with storm shutter systems having additional and/or alternative features.

The process 500 may be performed with a storm shutter system installed to a building adjacent an opening, and the storm shutter system may include a panel, a motor operable to drive the panel between a first position and a second position, and a control assembly operable to control the motor. For example, the process 500 may be performed with the storm shutter system 100, which generally includes a panel 110, a motor 130 operable to drive the panel 110 between a first position and a second position, and a control assembly 102 operable to control the motor 130.

The process 500 may begin with block 510, which generally includes receiving information from an external device. For example, block 510 may involve the control assembly 102 receiving information from an external device 80. In certain embodiments, the information received in block 510 may include an open/close signal, such as one received from a smart home system 82 and/or a mobile device 86. In certain embodiments, the information received in block 510 may include information relating to an adverse weather condition, and may, for example, be received from a smart home system 82, a weather service 84, a mobile device 86, and/or a warning siren 86. In certain forms, the information may be received electronically, such as from the smart home system 82, the weather service 84, and/or the mobile device 86. In certain embodiments, the information may be received acoustically, such as by the microphone 108 detecting a warning siren 88.

The process 500 may include block 520, which may be performed in response to receiving information in block 510, and which generally involves operating the motor to linearly drive the panel from a first position to a second position. For example, block 520 may involve the control assembly 102 operating the motor 130 to drive the panel 110 from one of an open position or a closed position to the other of the open position or the closed position. By way of illustration, block 520 may involve the control assembly 102 operating the motor 130 to drive the panel 110 from an open position to a closed position, for example in situations in which the information received in block 510 includes a close command and/or information indicating that an adverse weather condition is predicted. As another example, block 520 may involve the control assembly 102 operating the motor 130 to drive the panel 110 from a closed position to an open position, for example in situations in which the information received in block 510 includes an open command and/or indicates that the adverse weather condition has passed.

In certain embodiments, the process 500 may include block 530, which generally involves transitioning the storm shutter assembly from a secured state to an unsecured state. For example, block 530 may involve transitioning the storm shutter assembly 100 from a secured state to an unsecured state in response to movement of the handle 434 from the first position to the second position, thereby moving each latch 432 to its unlatching position as described above.

In certain embodiments, the process 500 may include block 540, which may be performed with the storm shutter system in the unsecured state and generally involves permitting pivotal movement of the panel to a third position. For example, block 540 may involve permitting the panel 110 to be pivoted from its swinging closed position to its swinging open position as described above.

Figure 11:
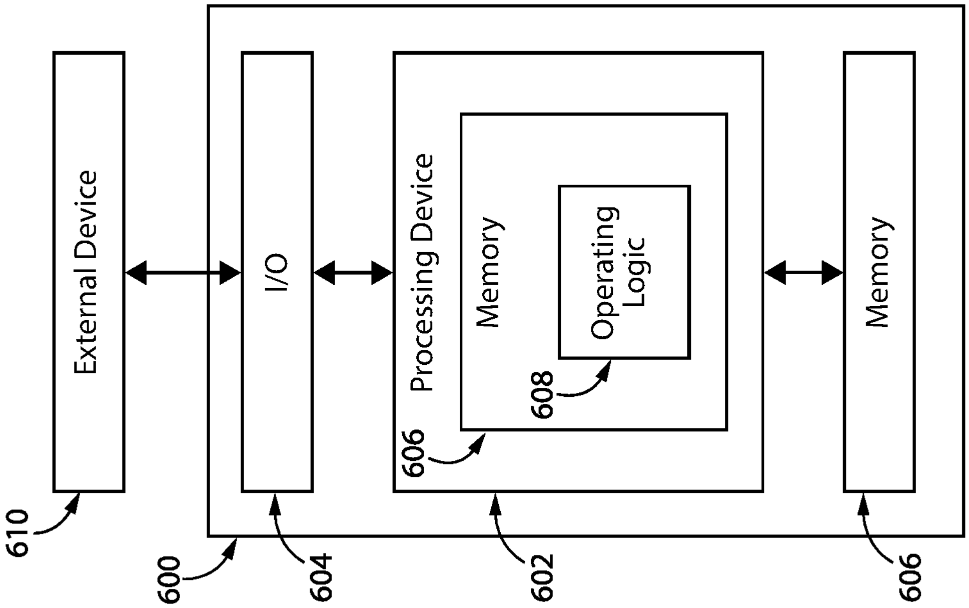
FIG. 11 is a schematic block diagram of a computing device that may be utilized in connection with certain embodiments.

Referring now to FIG. 11, a simplified block diagram of at least one embodiment of a computing device 600 is shown. The illustrative computing device 600 depicts at least one embodiment of a control assembly that may be utilized in connection with the control assembly 102 illustrated in FIG. 3.

Depending on the particular embodiment, the computing device 600 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 600 includes a processing device 602 that executes algorithms and/or processes data in accordance with operating logic 608, an input/output device 604 that enables communication between the computing device 600 and one or more external devices 610, and memory 606 which stores, for example, data received from the external device 610 via the input/output device 604.

The input/output device 604 allows the computing device 600 to communicate with the external device 610. For example, the input/output device 604 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 600. The input/output device 604 may include hardware, software, and/or firmware suitable for performing the techniques described herein.

The external device 610 may be any type of device that allows data to be inputted or outputted from the computing device 600. For example, in various embodiments, the external device 610 may be embodied as the motor 130, the smart home system 82, the weather service 84, the mobile device 86, and/or the warning siren 88. Further, in some embodiments, the external device 610 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 610 may be integrated into the computing device 600.

The processing device 602 may be embodied as any type of processor(s) capable of performing the functions described herein. In particular, the processing device 602 may be embodied as one or more single or multi-core processors, microcontrollers, or other processor or processing/controlling circuits. For example, in some embodiments, the processing device 602 may include or be embodied as an arithmetic logic unit (ALU), central processing unit (CPU), digital signal processor (DSP), and/or another suitable processor(s). The processing device 602 may be a programmable type, a dedicated hardwired state machine, or a combination thereof. Processing devices 602 with multiple processing units may utilize distributed, pipelined, and/or parallel processing in various embodiments. Further, the processing device 602 may be dedicated to performance of just the operations described herein, or may be utilized in one or more additional applications. In the illustrative embodiment, the processing device 602 is of a programmable variety that executes algorithms and/or processes data in accordance with operating logic 608 as defined by programming instructions (such as software or firmware) stored in memory 606. Additionally or alternatively, the operating logic 608 for processing device 602 may be at least partially defined by hardwired logic or other hardware. Further, the processing device 602 may include one or more components of any type suitable to process the signals received from input/output device 604 or from other components or devices and to provide desired output signals. Such components may include digital circuitry, analog circuitry, or a combination thereof.

The memory 606 may be of one or more types of non-transitory computer-readable media, such as a solid-state memory, electromagnetic memory, optical memory, or a combination thereof. Furthermore, the memory 606 may be volatile and/or nonvolatile and, in some embodiments, some or all of the memory 606 may be of a portable variety, such as a disk, tape, memory stick, cartridge, and/or other suitable portable memory. In operation, the memory 606 may store various data and software used during operation of the computing device 600 such as operating systems, applications, programs, libraries, and drivers. It should be appreciated that the memory 606 may store data that is manipulated by the operating logic 608 of processing device 602, such as, for example, data representative of signals received from and/or sent to the input/output device 604 in addition to or in lieu of storing programming instructions defining operating logic 608. As illustrated, the memory 606 may be included with the processing device 602 and/or coupled to the processing device 602 depending on the particular embodiment. For example, in some embodiments, the processing device 602, the memory 606, and/or other components of the computing device 600 may form a portion of a system-on-a-chip (SoC) and be incorporated on a single integrated circuit chip.

In some embodiments, various components of the computing device 600 (e.g., the processing device 602 and the memory 606) may be communicatively coupled via an input/output subsystem, which may be embodied as circuitry and/or components to facilitate input/output operations with the processing device 602, the memory 606, and other components of the computing device 600. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 600 may include other or additional components, such as those commonly found in a typical computing device (e.g., various input/output devices and/or other components), in other embodiments. It should be further appreciated that one or more of the components of the computing device 600 described herein may be distributed across multiple computing devices. In other words, the techniques described herein may be employed by a computing system that includes one or more computing devices. Additionally, although only a single processing device 602, I/O device 604, and memory 606 are illustratively shown in FIG. 11, it should be appreciated that a particular computing device 600 may include multiple processing devices 602, I/O devices 604, and/or memories 606 in other embodiments. Further, in some embodiments, more than one external device 610 may be in communication with the computing device 600.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A storm shutter system, comprising:

a support rail configured to be mounted to a building adjacent an opening;

a panel mounted to the support rail for movement between a closed position, in which the panel covers the opening, and an open position, in which the opening is exposed;

a motor operable to move the panel from the open position to the closed position;

a microphone; and a control assembly operable to control the motor, wherein the control assembly is configured to cause the motor to drive the panel from the open position to the closed position in response to detection of a severe weather warning siren via the microphone.

2. The storm shutter system of claim 1, wherein the panel is mounted for sliding movement along the support rail.

3. The storm shutter system of claim 2, wherein the panel is pivotable relative to the support rail.

4. A storm shutter system, comprising:

a support rail;

a panel movably mounted to the support rail;

a motor operable to move the panel from an open position to a closed position;

a microphone; and a control assembly operable to control the motor, wherein the control assembly is configured to detect a severe weather event based upon information received via the microphone, and to cause the motor to drive the panel from the open position to the closed position in response to detection of the severe weather event, and wherein the control assembly is configured to detect the severe weather event in response to identifying a severe weather warning siren via the microphone.

5. The storm shutter system of claim 4, wherein the panel is mounted for sliding movement along the support rail.

6. The storm shutter system of claim 5, wherein the panel is pivotable relative to the support rail.

7. A storm shutter system, comprising:

a pair of movable panels;

a motor operable to move the pair of panels between an open state and a closed state;

a microphone; and a control assembly operable to control the motor, wherein the control assembly is configured to detect a severe weather warning siren via the microphone, and to cause the motor to drive the panels from the open state to the closed state in response to detection of the severe weather warning siren.

8. The storm shutter system of claim 7, further comprising a support rail, wherein the panels are mounted for sliding movement along the support rail.

9. The storm shutter system of claim 8, wherein each of the panels is pivotable relative to the support rail.

* * * * *